July 29, 1969  J. F. BUTLER  3,457,784
EVAPORATION RATE MONITOR
Filed April 6, 1966
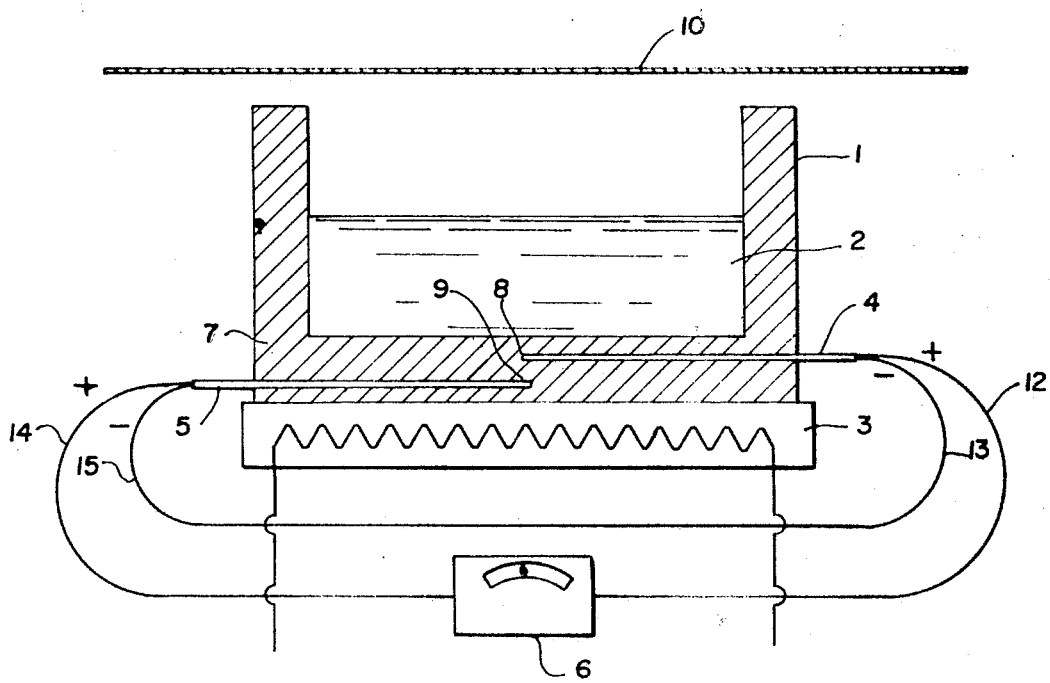
INVENTOR.
JOHN F. BUTLER
BY
*JR Harris*
his ATTORNEY United States Patent Office 3,457,784
Patented July 29, 1969

3,457,784
EVAPORATION RATE MONITOR
John F. Butler, Bethel Park, Pa., assignor to Jones & Laughlin Steel Corporation, Pittsburgh, Pa., a corporation of Pennsylvania
Filed Apr. 6, 1966, Ser. No. 540,693
Int. Cl. G01k 17/02
U.S. Cl. 73—190      4 Claims

ABSTRACT OF THE DISCLOSURE

Two thermocouples are positioned in the wall of an evaporation crucible, one adjacent the outside surface to which heat is supplied and the other adjacent the inside surface. The temperature difference between them is a measure of the rate of evaporation of the liquid in the crucible.

---

It is known to coat a metal substrate such as steel strip or the like with a coating metal by vaporizing the coating metal in an evacuated chamber and causing it to condense on the substrate. If the coating process is to be carried out on a continuous basis as must be done for the production of coated strip, it is desirable to know the rate at which the coating metal is evaporating in the evacuated chamber. This rate, together with the speed of travel of the strip, are the principal factors governing the weight of the coating metal condensed on the substrate. To obtain a uniform weight of coating on the strip, the rate of evaporation of the coating metal and the speed of travel of the strip should be maintained constant. It is sufficient, for the commerical production of coated strip, that the rate of evaporation of the coating metal be determinable under steady state conditions.

It is an object of my invention, therefore, to provide a method of determining the rate of evaporation of a molten metal in a vacuum under reasonably steady state conditions. It is another object to provide apparatus for carrying out that method. Other objects of my invention will become apparent in the course of the description thereof which follows.

I have found that the rate of evaporation of a liquid from a crucible in a vacuum under steady state conditions can be continuously determined indirectly by measurement of the temperature gradient in a wall of the crucible separating the source of heat from the evaporating liquid. Computation of the temperature gradient and the co-efficient of thermal conductivity of the wall material will yield the heat input per unit area per unit time. If this is constant over the entire heated surface area, the total heat flux to the crucible can be determined. The evaporation rate is then linked to the heat flux simply through heat of evaporation of the liquid at its evaporating temperature. The determination of the evaporation rate in this manner will be exact if the temperature of the liquid and the temperature of the heat source are constant and heat loss from unheated walls and the liquid is negligible.

The temperature gradient across a wall of the crucible is conveniently measured by a pair of small sheath thermocouples inserted in holes drilled from an unheated edge into the crucible wall. To minimize heat conduction along the walls of the thermocouple sheaths, the holes for the thermocouples are drilled along isothermal planes in the temperature gradient. In most cases, these holes are drilled parallel to the wall surfaces. The spacing between the embedded junctions of the thermocouples is maintained as great as the thickness of the crucible wall permits to obtain a large difference in temperature to measure. The temperature gradient is then measured directly by using one thermocouple as the hot junction and the other as the reference cold junction.

An embodiment of my invention presently preferred by me is diagrammatically illustrated in the attached figure to which reference is now made. The evacuated chamber, the entrance and exit lock, and the means for transporting the substrate are not shown as they are conventional and form no part of my invention. The substrate 10 in the form of strip is caused to move horizontally above crucible 1 which is provided with side walls and a bottom 7. Crucible 1 is heated by electric means 3 positioned immediately below it. Within crucible 1 is maintained a pool of molten coating metal 2 which vaporizes at the reduced pressure within the evacuated chamber and condenses on the under surface of substrate 10.

In the bottom wall 7 of crucible 1 are inserted a thermocouple 4 adjacent and parallel to the upper surface of that wall, and a thermocouple 5 adjacent and parallel to the lower surface of that wall. The hot junction 8 of thermocouple 4 is positioned midway between the side walls of crucible 1 directly above the hot junction 9 of thermocouple 5. It is convenient to insert thermocouples 4 and 5 in holes drilled into bottom wall 7 having just enough clearance to allow a snug fit. In this way thermocouples 4 and 5 are effectively embedded in bottom wall 7.

Conductors 12 and 13 are connected to the positive and negative wires of thermocouple 4, respectively, and conductors 14 and 15 are connected to the positive and negative wires of thermocouple 5, respectively. Conductors 13 and 15 are joined outside the evacuated chamber and conductors 12 and 14 are connected to a potentiometer 6. The voltage difference between conductors 12 and 14 determined by potentiometer 6 measures the difference between the temperatures of the hot junctions 9 and 8 of thermocouples 5 and 4, respectively.

As heat is supplied by heating means 3 to vaporize the molten metal 2 through bottom wall 7 of crucible 1, hot junction 9 is at a higher temperature than hot junction 8. The direction of heat flow in the region of the bottom wall 7 midway between the side walls of crucible 1 is perpendicular to bottom wall 7 so that hot junctions 8 and 9 lie on a line of heat flow. The heat flow through bottom wall 7 is perpendicular to that wall or substantially so over the greater portion of bottom wall 7 between the side walls of crucible 1 so that the major portions of thermocouples 4 and 5, from their respective hot junctions back toward their outer ends, lie in planes which are isothermal. Under steady state conditions, the temperature difference between hot junctions 9 and 8 is thus a measure of the rate of evaporation of coating metal 2.

I claim:
1. In apparatus for evaporating a liquid including an externally heated crucible, the improvement comprising first temperature measuring means adjusted and adapted to measure the temperature of an outer region of the wall of the crucible adjacent to the source of heat, second temperature measuring means adapted and adjusted to measure the temperature of an inner region of the same wall immediately opposite the outer region and means for indicating the difference in temperature between the first and the second temperature measuring means.

2. Apparatus of claim 1 in which the first temperature measuring means is a first thermocouple and the second temperature measuring means is a second thermocouple.

3. Apparatus of claim 2 in which the first and the second thermocouples are positioned in holes in the crucible wall opening out of unheated regions thereof.

4. Apparatus of claim 2 in which the outer and inner regions of the crucible wall are directly opposite each other.

References Cited

UNITED STATES PATENTS

| | | | |
|---|---|---|---|
| 1,815,061 | 7/1931 | Harsch | 236—69 |
| 3,238,775 | 3/1966 | Watts | 73—190 |
| 3,297,944 | 1/1967 | Nektaredes et al | 73—15 |

OTHER REFERENCES

Bunshah, Rointan Vacuum Metallurgy Reinhold Publishing 1958 pp. 298–301 and 305.

Smith, Alpheus W., Elements of Physics (1948), pp. 270–274.

JAMES J. GILL, Primary Examiner

H. GOLDSTEIN, Assistant Examiner

U.S. Cl. X.R.

73—15; 117—107.1